United States Patent [19]
David et al.

[11] Patent Number: 5,846,455
[45] Date of Patent: Dec. 8, 1998

[54] METHOD OF STABILIZING AN AQUEOUS SOLUTION OF $^{99}$MO MOLYBDATE

[75] Inventors: Bernard David; Livio Turcato, both of Weesp, Netherlands

[73] Assignee: Institut National des Radio Elements, Fleurus, Belgium

[21] Appl. No.: 761,640

[22] Filed: Dec. 6, 1996

[30] Foreign Application Priority Data

Dec. 11, 1995 [EP] European Pat. Off. ............... 95203444

[51] Int. Cl.$^6$ ....................................................... C69K 3/00
[52] U.S. Cl. ............................................................ 252/645
[58] Field of Search ............................................. 252/645

[56] References Cited

U.S. PATENT DOCUMENTS

| | | | |
|---|---|---|---|
| 4,123,497 | 10/1978 | Ruddock | 423/2 |
| 4,206,358 | 6/1980 | Matthews et al. | 252/645 |
| 5,162,505 | 11/1992 | Dean et al. | 424/1.1 |
| 5,185,433 | 2/1993 | Dean et al. | 530/391.1 |
| 5,431,900 | 7/1995 | Bergstein et al. | 424/165 |

OTHER PUBLICATIONS

Derwent Publications Ltd., London, GB; AN 88–041090.
"A 99Mo–99mTC Generator based on the use of Zirconium Molybdophosphate–99Mo Gel"; by El–Kolaly; May 1993.
"Zirconium Molybdate Gel as a Generator for Technetium–99m"; by Evans et al.
"Zirconium Molybdate Gel as a Generator for Technetium.99M"; by Moore et al.

*Primary Examiner*—Edward A. Miller
*Attorney, Agent, or Firm*—Stevens, Davis, Miller & Mosher, L.L.P.

[57] ABSTRACT

The present invention relates to a method of stabilizing an aqueous solution of $^{99}$Mo molybdate, characterized in that a substance, selected from water-soluble nitrates, chlorates and phosphates is added.

The invention further relates to aqueous solutions of $^{99}$Mo molybdate containing an added stabilizing substance, and optionally an added oxidizing agent.

15 Claims, No Drawings

METHOD OF STABILIZING AN AQUEOUS SOLUTION OF $^{99}$MO MOLYBDATE

The present invention relates to a method of stabilizing an aqueous solution of $^{99}$Mo molybdate. The invention further relates to aqueous solutions of $^{99}$Mo molybdate containing an added stabilizing substance.

The present invention relates to aqueous solutions of $^{99}$Mo molybdate with a high radioactivity, generally in the order of many thousands of GBq. Solutions of this type are prepared by methods known in the art and are shipped and sold in a formulated form. These solutions also contain 0.2N or 2.0N sodium hydroxide, and are sometimes buffered up to pH 5 by addition of an acid as e.g. acetic acid. The solutions are shipped in vials of e.g. 100 ml to customers where they are used for the production of $^{99m}$Tc pertechnetate for nuclear medicine purposes.

It is known in the art, that during storage and shipment time two main problems are encountered. On the one hand the strong radioactivity in the solution easily leads to reduction of the molybdenum in the molybdate ion, from its optimal oxidation state 6+ to a lower oxidation state. This phenomenon may cause the formation of a black-coloured precipitate in the solution that only can be removed by a very laborious procedure. It is known in the art that this reduction can be prevented by an oxidizing agent, preferably hypochlorite.

On the other hand it is also well known in the art that the strong radioactivity of the $^{99}$Mo molybdate solution frequently leads to pressure build-up in the vial up to 7–10 kg/cm$^2$ during storage or shipment. It will be clear that for safety reasons this pressure build-up in a vial also containing a large amount of radioactivity is very threatening, both during shipment and during opening of the vial at the customers site.

It is the objective of the present invention to provide for a method of stabilizing aqueous solutions of $^{99}$Mo molybdate. The term stabilizing used throughout the specification and claims means the prevention of pressure build-up.

This objective can be achieved according to the present invention by a method of stabilizing an aqueous solution of $^{99}$Mo molybdate, characterized in that a substance, selected from water-soluble nitrates, chlorates and phosphates is added.

The above mentioned method of addition of the above defined substance surprisingly leads to the prevention of pressure build-up. When needed also an oxidizing agent can be added in order to prevent the above mentioned reduction of the molybdate. Suitable oxidizing agents are hypochlorites and hydrogen peroxide.

The preferred stabilizing agents are water-soluble nitrates. Examples of water-soluble nitrates are sodium nitrate, potassium nitrate and ammonium nitrate. Most preferred is the addition of ammonium nitrate.

It is an additional advantage of the present invention that it has been found that the addition of a separate oxidizing agent is no longer necessary when nitrates are used as stabilizing agents. This is also an important advantage because hypochlorite and hydrogen peroxide are relatively unstable molecules which might increase the pressure build-up in the vial.

$^{99}$Mo molybdate solutions containing an amount of a stabilizing agent, added as described above are also new. Therefore the present invention also relates to an aqueous solution of $^{99}$Mo molybdate, characterized in that said solution contains a stabilizing substance selected from water-soluble nitrates, chlorates and phosphates, added in an amount resulting in a concentration in the aqueous solution of between 0.1 and 10 mol/l, preferably between 0.5 and 2 mol/l. These solutions can also contain an additionally added oxidizing agent. The preferred stabilizing agents are water-soluble nitrates. Most preferred is ammonium nitrate. In case nitrates are used as stabilizers, a separate oxidizing agent is not needed.

The invention will now be described in greater detail with reference to the following specific example.

EXAMPLE

In a capsule with an internal diameter of 29 mm and a height of 71 mm, resulting in an internal volume of 39.6 ml, and equipped with a manometer, x ml of a molybdate solution in 0.2N NaOH containing y GBq of radioactivity is deposited. Amounts of crystalline ammonium nitrate, ranging between 0 and 2.24 g are brought into the capsule on beforehand. After closing of the capsule the pressure P is measured as a function of time, and appears to go through a maximum. The maximum value of P measured and the corresponding time are depicted in the table below.

| Exp. | x | y | $NH_4NO_3$ added (g)/(mol/l) | Free space (ml) | t | P (Bar) |
| --- | --- | --- | --- | --- | --- | --- |
| 1 | 37.27 | 32740 | — | 2.32 | 17 | 5.8[1] |
| 2 | 24.25 | 23400 | — | 15.34 | 49 | 4.0 |
| 3 | 27.96 | 38183 | 2.24/1.0 | 11.63 | 25 | 1.3 |
| 4 | 16.33 | 17465 | 1.31/1.0 | 23.26 | 16 | 1.2[2] |

Notes:
[1])The experiment 1 is stopped at t = 17 h, before the maximum pressure is reached.
[2])The pressure of 1.2 Bar is reached after 16 hours and remains 1.2 Bar until the last measuring point at t = 87 h.

From the results it is clear that the addition of ammonium nitrate prevents the pressure build-up to a large extend. The solutions of Experiments 3 and 4 can be shipped and stored as such, so without separately added oxidizing agent, leaving the molybdenum in its optimal oxidation state 6+.

We claim:
1. Method of stabilizing an aqueous solution of $^{99}$Mo molybdate, characterized in that a substance, selected from water-soluble nitrates, chlorates and phosphates is added.
2. Method according to claim 1, characterized in that a mixture of said substance and a separate oxidizing agent are added.
3. Method according to claim 2, characterized in that said oxidizing agent is a hypochlorite or hydrogen peroxide.
4. Method according to claim 1, characterized in that said substance is a water-soluble nitrate, and that a separate oxidizing agent is not added.
5. Method according to claim 4, characterized in that said substance is ammonium nitrate.
6. Method according to claim 1, characterized in that said substance is added in an amount resulting in a concentration of the substance in the aqueous solution of between 0.1 and 10 mol/l.
7. Method according to claim 6, characterized in that said substance is added in an amount resulting in a concentration of the substance in the aqueous solution of between 0.5 and 2 mol/l.
8. Aqueous solution of $^{99}$Mo molybdate, characterized in that said solution contains a stabilizing substance, selected from water-soluble nitrates, chlorates and phosphates, in an amount resulting in a concentration in the aqueous solution of between 0.1 and 10 mol/l.
9. Aqueous solution according to claim 8, characterized in that said solution also contains an oxidizing agent.

10. Aqueous solution according to claims 8, characterized in that said stabilizing substance is a water-soluble nitrate.

11. Aqueous solution according to claim 8, characterized in that said substance is added in an amount resulting in a concentration in the aqueous solution of between 0.5 and 2 mol/l.

12. The aqueous solution according to claim 10, wherein the water-soluble nitrate is ammonium nitrate.

13. The aqueous solution according to claim 9, wherein the oxidizing agent is a hypochlorite or hydrogen peroxide.

14. The aqueous solution according to claim 12, characterized in that said substance is added in an amount resulting in a concentration in the aqueous solution of between 0.5 and 2 mol/l.

15. The aqueous solution according to claim 13, characterized in that said substance is added in an amount resulting in a concentration in the aqueous solution of between 0.5 and 2 mol/l.

\* \* \* \* \*